US008789732B2

(12) United States Patent
Aftanas et al.

(10) Patent No.: US 8,789,732 B2
(45) Date of Patent: Jul. 29, 2014

(54) STAMPED ROOF RAIL FOR VEHICLE ARTICLE CARRIER AND METHOD OF MAKING SAME

(75) Inventors: Jeffrey M. Aftanas, Ortonville, MI (US); Donald L. Munoz, Bloomfield Hills, MI (US)

(73) Assignee: JAC Products, Inc., Saline, MI (US)

( * ) Notice: Subject to any disclaimer, the term of this patent is extended or adjusted under 35 U.S.C. 154(b) by 274 days.

(21) Appl. No.: 13/455,511

(22) Filed: Apr. 25, 2012

(65) Prior Publication Data

US 2012/0273535 A1 Nov. 1, 2012

Related U.S. Application Data

(60) Provisional application No. 61/480,273, filed on Apr. 28, 2011.

(51) Int. Cl.
*B60R 9/04* (2006.01)

(52) U.S. Cl.
CPC ........................................ *B60R 9/04* (2013.01)
USPC .......................................... 224/326; 224/309

(58) Field of Classification Search
CPC .... B60R 9/04; B60R 9/052; B60R 2011/0026
USPC ................... 224/309, 322, 325, 326; 296/210
See application file for complete search history.

(56) References Cited

U.S. PATENT DOCUMENTS

| 4,225,068 | A | 9/1980 | Ingram |
| 4,343,419 | A | 8/1982 | Mareydt |
| 5,016,798 | A | 5/1991 | Stapleton et al. |
| 5,016,799 | A | 5/1991 | Stapleton |
| 5,826,765 | A | 10/1998 | Rak et al. |
| 5,871,130 | A | 2/1999 | Cucheran et al. |
| 6,311,882 | B1 | 11/2001 | Allison et al. |
| 6,902,229 | B2* | 6/2005 | Bradbrook et al. ........... 296/210 |
| 7,017,788 | B2* | 3/2006 | Trambley et al. ............. 224/326 |
| 8,056,783 | B2* | 11/2011 | Hirano et al. ................. 224/326 |
| 8,523,032 | B2* | 9/2013 | Neidlein ........................ 224/321 |
| 8,627,989 | B2* | 1/2014 | Aftanas et al. ................ 224/326 |
| 2007/0158965 | A1* | 7/2007 | Van Smirren ..................... 296/3 |

* cited by examiner

*Primary Examiner* — Justin Larson
(74) *Attorney, Agent, or Firm* — Harness, Dickey & Pierce, P.L.C.

(57) ABSTRACT

A vehicle article carrier system incorporating a pair of stamped support rails that are adapted to be fixedly secured within respective roof ditches of a roof of a vehicle. At least one cross bar may be secured to portions of the support rails. Bottom wall and side wall portions of the support rails are shaped to rest nestably within their respective roof ditches. The support rails add significant structural strength and rigidity to the roof structure of a vehicle once fixedly secured within the roof ditches.

20 Claims, 9 Drawing Sheets

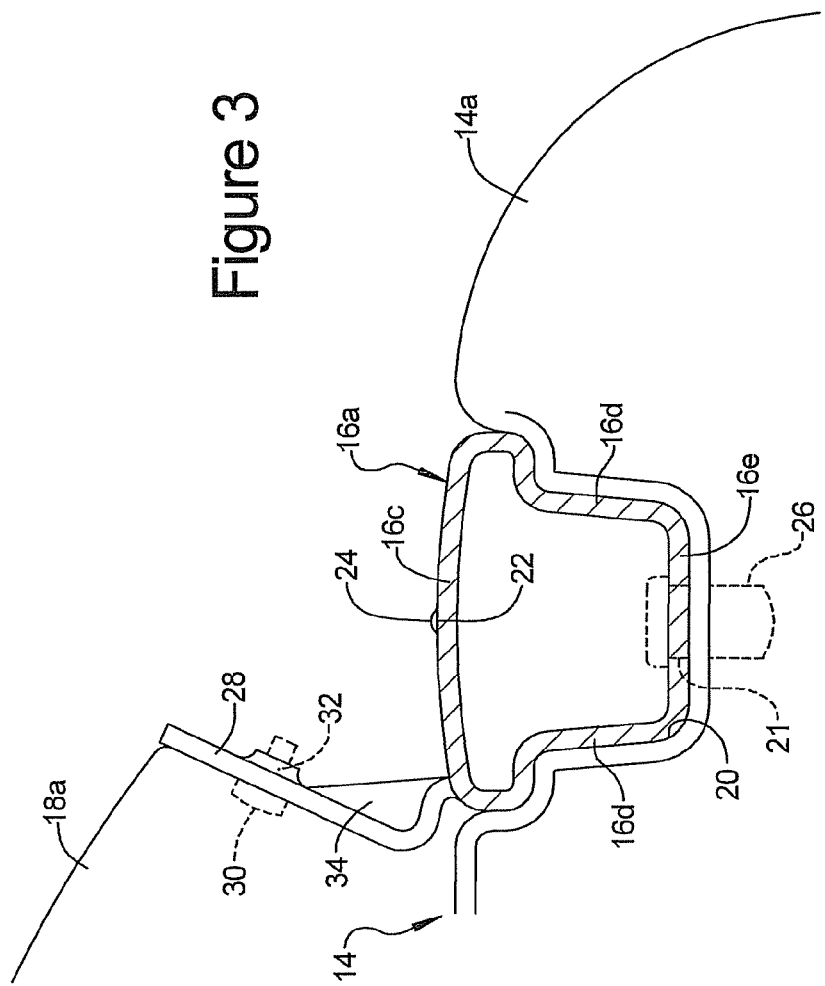
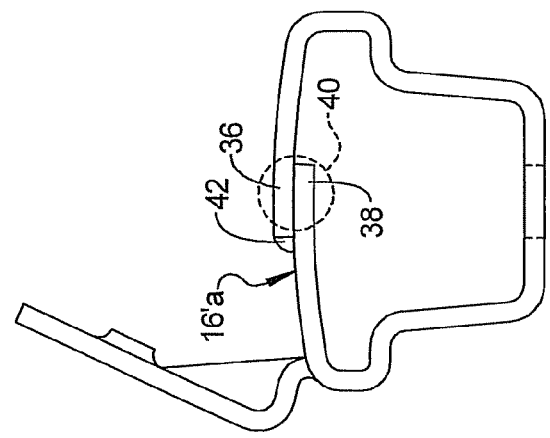

STAMPED ROOF RAIL FOR VEHICLE ARTICLE CARRIER AND METHOD OF MAKING SAME

CROSS-REFERENCE TO RELATED APPLICATIONS

This application claims the benefit of U.S. Provisional Application No. 61/480,273, filed on Apr. 28, 2011. The entire disclosure of the above application is incorporated herein by reference.

FIELD

The present disclosure relates to vehicle article carrier systems, and more particularly to a stamped support rail adapted to be affixed within a roof ditch of a vehicle roof that provides significant added strength to the vehicle's roof.

BACKGROUND

The statements in this section merely provide background information related to the present disclosure and may not constitute prior art.

Vehicle article carrier systems are used in a wide variety of applications to support articles of various sizes and shapes above an outer body surface of a motor vehicle. Vehicle article carrier systems can be found in use on a wide variety of different types of motor vehicles such as cars, SUVs, trucks, mini-vans, full size vans, etc. Typically a vehicle article carrier makes use of a pair of support rails that are secured to the outer body surface of the vehicle, and typically a roof of the vehicle. The support rails are typically secured parallel to one another and extend along a major longitudinal length of the vehicle. Typically one or more cross bars are supported at their outer ends by the support rails such that the cross bar(s) extend perpendicularly to the support rails and above the roof surface. Articles are then supported on the cross bars so that they are positioned above the roof of the vehicle.

Traditionally the support rails have been formed from aluminum using a conventional extrusion molding process or sometimes a conventional roll forming process. With both of these processes, the formed support rail will be tubular in construction. However, the cross sectional shape of the support rail must remain constant over the full length of the support rail. That is because there presently is no known way to modify an extrusion molding operation or a roll forming operation such that the cross sectional shape of the support rail can be changed at various points along the length of the support rail. As one can appreciate, this limits the design possibilities for the support rails, both from an aesthetics standpoint as well as a structural standpoint. It would be highly desirable to be able to form the support rails from aluminum or steel, in a cost effective manufacturing operation, where the cross sectional shape and/or area of the support rail is varied over its length. The variation in cross sectional shape or cross sectional area could be selected to provide a unique, aerodynamic appearance and shape, or possibly to provide the support rail with a cross sectional shape at various points along its length which significantly increases it strength and rigidity.

A consideration of motor vehicle manufacturers that is growing in importance is the need to strengthen the roof structure of a motor vehicle, and particularly roof structures of passenger cars and trucks. U.S. governmental crash test requirements are growing in stringency and requiring passenger vehicles to meet increasingly demanding roll over resistance crash tests. During such crash tests a force is applied to the edge of a vehicle roof by a hydraulic ram that applies the force typically at a predetermined angle, often between 20-30 degrees to the plane formed by the outer surface of the vehicle roof. The roof must be able to withstand a predetermined force while suffering only a somewhat modest crushing or "caving in" of the roof structure. Federal guidelines presently exist that define the degree of acceptable "crushing" or "caving in" of the roof structure, and as mentioned above these requirements are slated to be increased in stringency over the next few years. Accordingly, there is an immediate and growing need for motor vehicle manufacturers to strengthen the roof structure of their vehicles using any means that does not significantly complicate the construction process or otherwise add significantly to the cost, weight or complexity of the vehicle.

SUMMARY

In one aspect the present disclosure relates to a vehicle article carrier system for securing articles above an outer body roof surface of a vehicle. The outer body roof surface includes a pair of roof ditches formed therein that extend generally parallel to one another along a major longitudinal length of the vehicle. The vehicle article carrier system may comprise a pair of support rails adapted to be secured to the outer body roof surface within respective ones of the roof ditches. At least one cross bar may be included which is configured to be secured to the support rails to extend generally perpendicularly between the support rails. The at least one cross may be adapted to support articles thereon above the outer body roof surface. Each one of the pair of support rails may be formed from a stamping process and may include a bottom wall, a pair of sidewalls extending from the bottom wall, and an upper wall extending from the pair of sidewalls. A cross bar mounting portion may be formed to extend from at least one of the sidewalls and the upper wall. The cross bar mounting portion may form a structural component to which a portion of the cross bar may be attached to support the cross bar in an operative position. At least the bottom wall and portions of the sidewalls may be formed with a cross sectional shape in close accordance with a cross sectional shape of its respective roof ditch to nest within its respective roof ditch. A fastener may be included for securing the bottom wall to its respective roof ditch. The cross sectional shape of the support rail and its nested mounting within its respective roof ditch serves to enhance a structural strength of the outer body roof surface.

In another aspect the present disclosure relates to a vehicle article carrier system for securing articles above an outer body roof surface of a vehicle. The outer body roof surface includes a pair of roof ditches formed therein that extend generally parallel to one another along a major longitudinal length of the vehicle. The vehicle article carrier system may comprise a pair of support rails adapted to be secured to the outer body roof surface within respective ones of the roof ditches. At least one cross bar may be included which is configured to be secured to the support rails to extend generally perpendicularly between the support rails. The at least one cross may be adapted to support articles thereon above the outer body roof surface. Each one of the pair of support rails may be formed from a stamping process from a single piece of material. Each one of the pair of support rails may include a bottom wall having structure enabling it to be secured to the outer body roof surface, a pair of sidewalls extending from the bottom wall, and an upper wall extending from the pair of sidewalls. A cross bar mounting portion may be formed which extends outwardly from at least one of the sidewalls and the upper wall. The cross bar mounting portion may project above the upper wall and may form a structural component to which a portion of the cross bar may be attached to support the cross bar in an operative position. At least the bottom wall and portions of the sidewalls may be formed with a cross sectional shape in close accordance with a cross sectional shape of its respective roof ditch to nest within its respective roof ditch. The cross sectional shape of the support rail and its nested mounting within its respective roof ditch serves to enhance a structural strength of the outer body roof surface when the support rail is fixedly attached to its respective roof ditch.

In still another aspect the present disclosure relates to a vehicle article carrier system for securing articles above an outer body roof surface of a vehicle, wherein the outer body roof surface includes a pair of roof ditches formed therein that extend generally parallel to one another along a major longitudinal length of the vehicle. The vehicle article carrier system may comprise a pair of support rails adapted to be secured to the outer body roof surface within respective ones of the roof ditches. At least one cross bar may be included which is configured to be secured to the support rails to extend generally perpendicularly between the support rails. The at least one cross bar may be adapted to support articles thereon above the outer body roof surface. Each one of the pair of support rails may be formed from a stamping process from a single piece of material. Each of the support rails may include a bottom wall having first structure enabling it to be secured to said outer body roof surface, a pair of sidewalls extending from the bottom wall, and an upper wall extending from the pair of sidewalls. The upper wall may have second structure enabling the at least one cross bar to be secured thereto and supported from the upper wall. At least the bottom wall and portions of the sidewalls may be formed with a cross sectional shape in close accordance with a cross sectional shape of its respective roof ditch to nest within its respective roof ditch. The cross sectional shape of the support rail and its nested mounting within its respective roof ditch serves to enhance a structural strength of the outer body roof surface when the support rail is fixedly attached to its respective roof ditch.

BRIEF DESCRIPTION OF THE DRAWINGS

The drawings described herein are for illustration purposes only and are not intended to limit the scope of the present disclosure in any way.

FIG. 3 is a cross section of the metallic support rail of FIG. 2 taken along section line 3-3 in FIG. 2;

FIG. 4 is a cross sectional end view of an alternative form of the support rail of FIG. 3 but incorporating overlapping terminal edge portions that form an overlapping seam;

DETAILED DESCRIPTION

Figure 1:
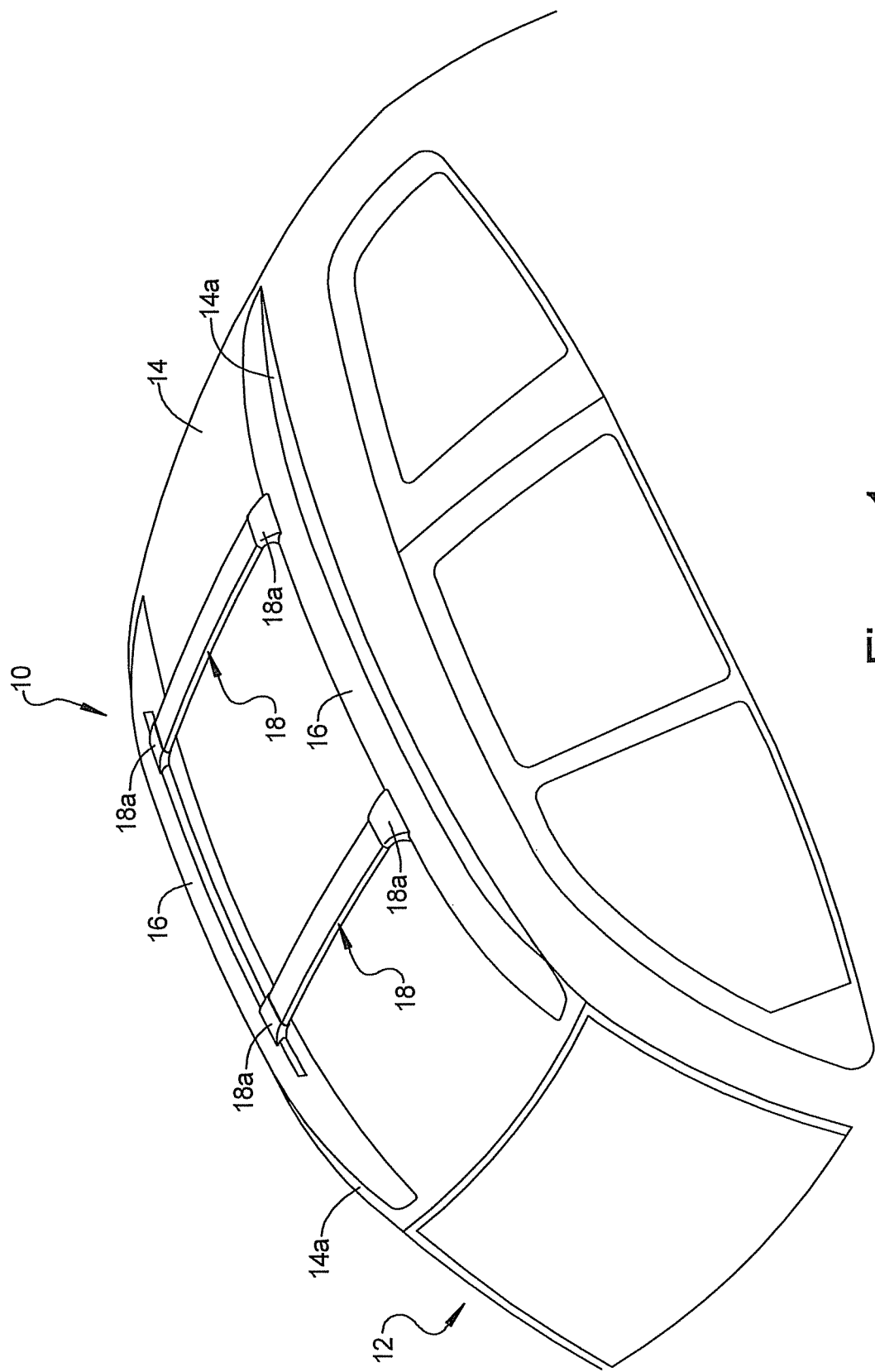
FIG. 1 is a perspective view of a motor vehicle, in this example a sport utility vehicle (SUV), incorporating a vehicle article carrier in accordance with one embodiment of the present disclosure.

The following description is merely exemplary in nature and is not intended to limit the present disclosure, application, or uses. It should be understood that throughout the drawings, corresponding reference numerals indicate like or corresponding parts and features.

Referring to FIG. 1, there is shown a vehicle article carrier system 10 installed on a roof 12 of a motor vehicle 14, which in this example is an SUV. However, it will be appreciated that the system 10 may be installed on virtually any other type of motor vehicle and is therefore not limited to use only on motor vehicles.

The system 10 includes a pair of support rails 16 that are fixedly secured to the roof 14. The support rails 16 are secured generally parallel to one another and extend along a major longitudinal axis of the vehicle 12. The support rails 16 are formed as a mirror image pair and as such are otherwise identical in construction. A pair of cross bars 18, which in this example are identical in construction, are secured to portions of the support rails 16. The cross bars 18 support articles thereon above the roof 14 with the aid of external fastening implements, not shown, which may include bungee straps, nylon ratcheting or cam buckle strap assemblies, etc.

Figure 2:
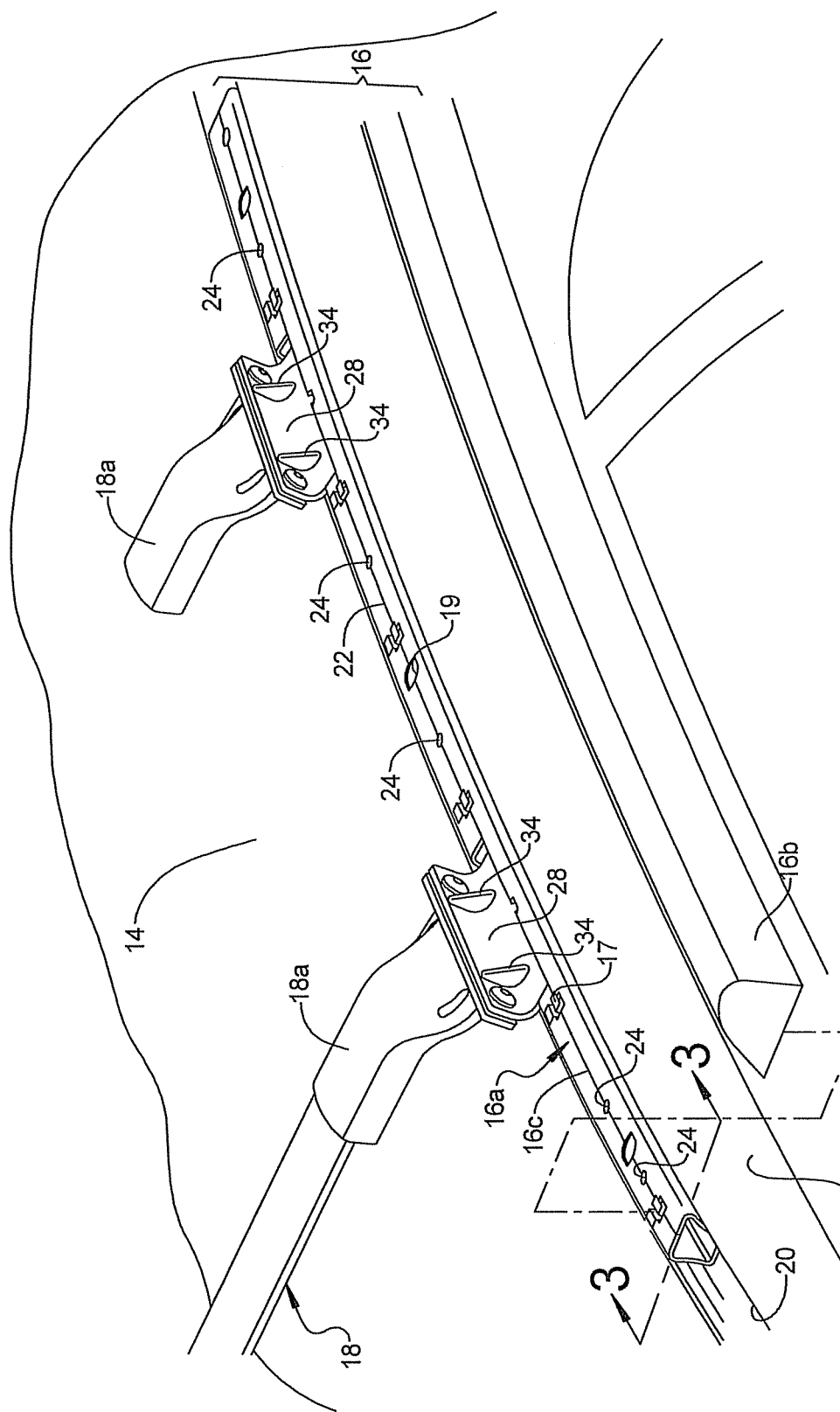
FIG. 2 is an enlarged section of a portion of the roof of the vehicle of FIG. 1 showing in greater detail one support rail of the vehicle article carrier with a decorative cover component having been removed from a metallic support rail to fully expose the metallic support rail, and with the metallic support rail positioned in a roof ditch of the vehicle.

Referring to FIG. 2, one of the support rails 16 is shown in greater detail. The support rail 16 includes a metallic support rail 16a and decorative cover, for example a plastic cover 16b, that may be secured to the metallic support rail 16a using any suitable fastening clips 17 or other suitable fastening structure. The roof 14 includes a pair of roof ditches 20, but only one is shown in FIG. 2. The roof ditches 20 extend parallel to one another near the longitudinal sides 14a (see also FIG. 1) of the roof 14. The roof ditches 20 form channels within which each of the metallic support rails 16a are disposed. The metallic support rails 16 are fixedly secured via suitable fasteners that are either associated with the support rails 16 or associated with the roof 14. In some instances RIVNUT® style fastening elements may be used to secure the metallic support rails 16a fixedly in the roof ditches 20, and in other instances threaded studs associated with the metallic support rails 16a may extend through holes (not shown) in the roof ditches 20. In the latter instance, external threaded nuts or like fastening components may be fastened to the threaded studs using access holes 19 formed in the metallic support rails 16a to secure the metallic support rails 16a fixedly within the roof ditches 20. In either event, the metallic support rail 16a has dimensions and a cross sectional shape that is selected at least in part in accordance with the dimensions and cross sectional shape of the roof ditch 20. In this manner the metallic support rail 16a is able to "nest" within its associated roof ditch 20 and to have an upper surface 16c that rests substantially flush with the roof 14 when installed in the roof ditch 20.

It is also preferred that the points of attachment of the metallic support rail 16a be aligned as close as possible (or practicable) with the A-pillar and the C-pillar of the vehicle. Attaching the metallic support rail 16a at these pillars of the vehicle 12 helps to transfer any force that is experienced by the metallic support rail 16a directly to the pillars, and therefore helps to improve the rollover crash worthiness of the vehicle 14, and specifically the strength of the roof 14.

Referring to FIG. 3, a cross sectional view of the metallic support rail 16a is shown with the metallic support rail positioned in the roof ditch 20. It is a principal advantage that the metallic support rail 16a is stamped from a single piece of material into a tubular configuration. The stamping operation is able to form the metallic support rail 16a such that it has a slight curvature along its longitudinal length so that it conforms to the slight curvature of the vehicle, and is therefore able to rest flush along its full length in the roof ditch 20. The stamping operation in this example produces a seam 22 that is shown along an upper surface 16c of the metallic support rail 16, although it will be appreciated that this seam could be formed at any point on the metallic support rail 16a, such as along vertical sidewall portions 16d or even on the bottom wall 16e. Preferably the seam 22 will be welded, as indicated by weld 24, either at selected spots or along the full longitudinal length of the seam 22. FIG. 3 also illustrates in phantom a fastener 26 that may be positioned through a hole 21 in the bottom wall 16e and used to secure the metallic support rail 16a in the roof ditch 20. Typically at least two such fasteners 26 are used in a corresponding plurality of spaced apart holes 21 in the bottom wall 16e to secure each metallic support element 16a within its respective roof ditch 20, although more three or more such fasteners are even more preferable.

The stamping operation also enables the metallic support rail 16a to be formed with an integral cross bar mounting portion 28 that projects at a desired angle to enable one end of one of the cross bars 18 to be secured thereto. Typically each cross bar 18 will include an end support 18a (see FIG. 1) at each end thereof. One end support 18a may be secured via at least one fastener 30 that threadably engages within a threaded hole 32 formed in the mounting portion 28. Obviously, more than one hole 32 may be provided and more than one fastener 30 may be used, and it may be preferred to incorporate a pair of fasteners 30 and a pair of holes 32. The stamping operation also enables one or more gussets 34 to be formed on the mounting portion 28 to provide structural rigidity to the cross bar mounting portion 28.

An alternative construction of the metallic support rail 16a is shown in FIG. 4 and denoted with reference number 16a'. This construction is also achieved by a stamping operation but rather than having the seam 22 shown in FIG. 3, the terminal ends 36 and 38 of the material blank used to form the rail 16a' overlap one another as indicated at 40. Weld 42 may be used at selected locations along the overlapping seam or along the full length of the overlapping seam of the metallic support rail 16a'. Otherwise the construction of the metallic support rail 16a' is identical to rail 16a.

Figure 5:
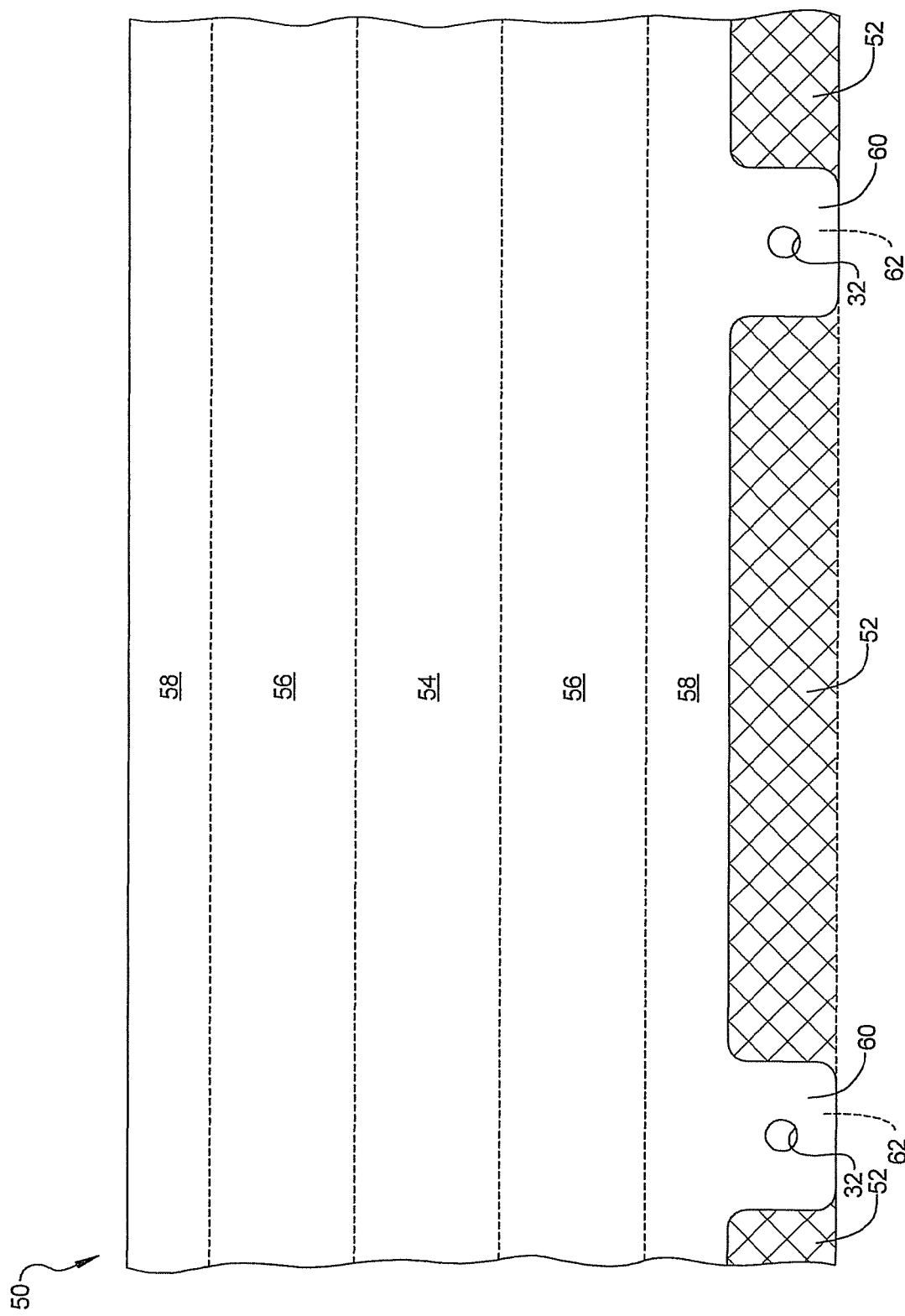
FIG. 5 is a plan view of a blank section of metallic material that may be used to form the metallic support rail in accordance with a stamping operation of the present disclosure.

Referring briefly to FIG. 5, a material blank 50 is shown from which the support rail 16a or 16a' may be formed. The material blank 50 may be formed from steel, aluminum or any other suitable metallic material having strength properties similar to steel or aluminum. Cross hatched portions 52 represent areas of material that have been removed to form the material blank 50. Material section 54 forms the bottom wall 16e (FIG. 3), material sections 56 form the sidewalls 16d, material sections 58 form the upper surface 16c, and material portions 60 form the cross bar mounting portions 28 when the material blank 50 is fully formed by the stamping operation of the present disclosure. Holes 32 may be formed prior to stamping the material blank 50 into the metallic support rail 16a or may be formed subsequent to the stamping operation. The gussets 34 in FIG. 3 may be formed on the material blank 50 by stamping the undersurface 62 of material portions 60 prior to forming the blank into the metallic support rail 16a, or possibly even subsequent to such forming.

Figure 6:
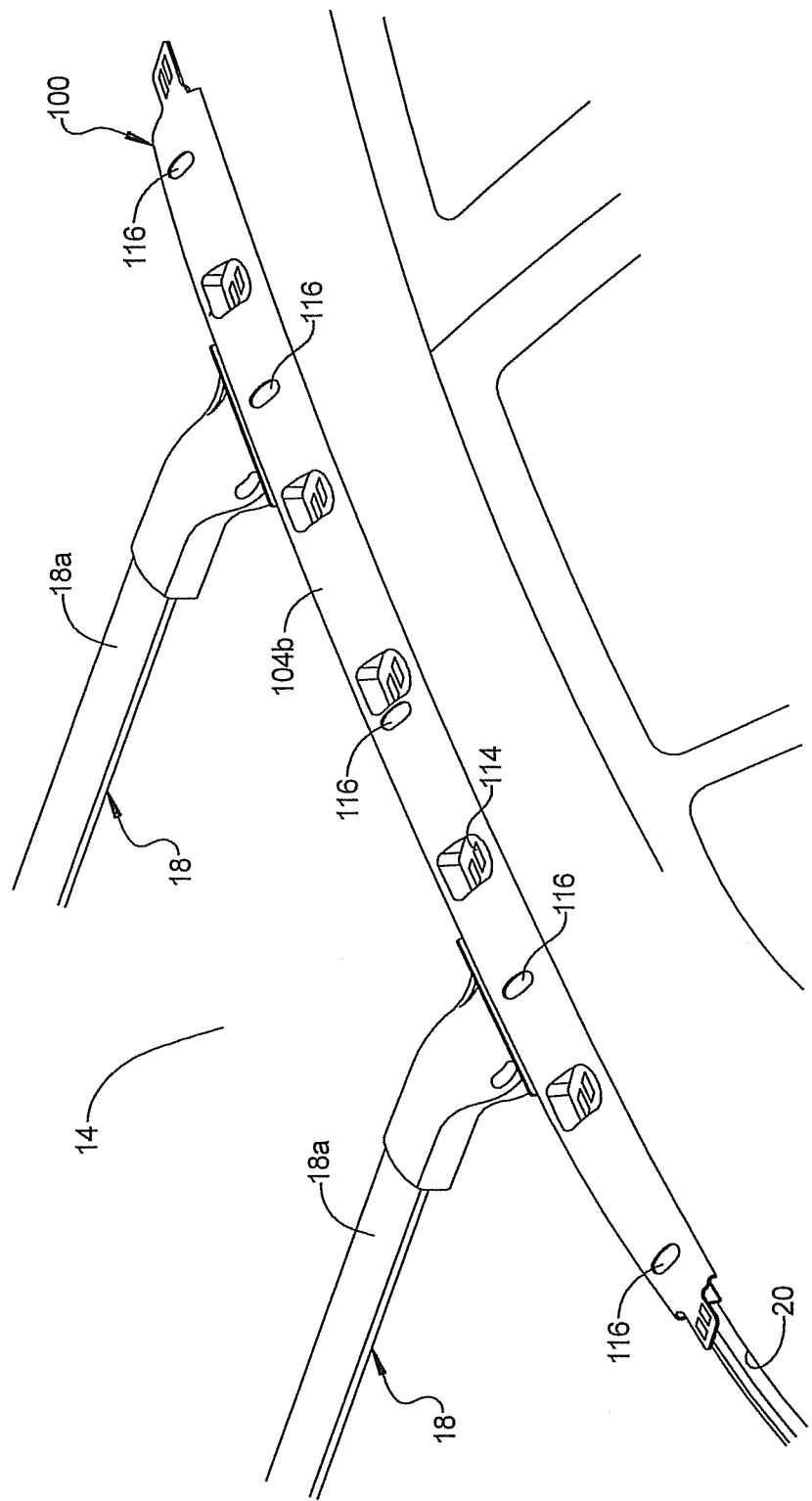
FIG. 6 is perspective view of another embodiment of a support rail in accordance with the present disclosure.
Figure 7:
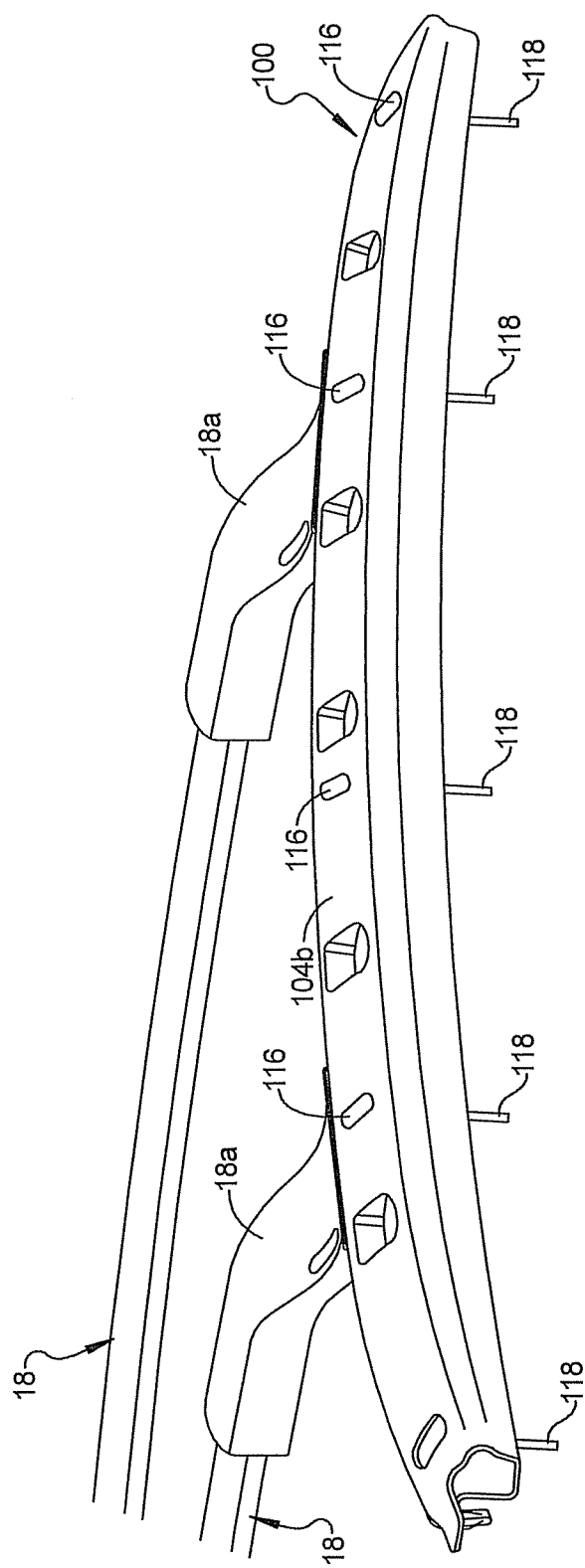
FIG. 7 is a perspective view of just the support rail of FIG. 6 with the cross bars attached thereto.
Figure 8:
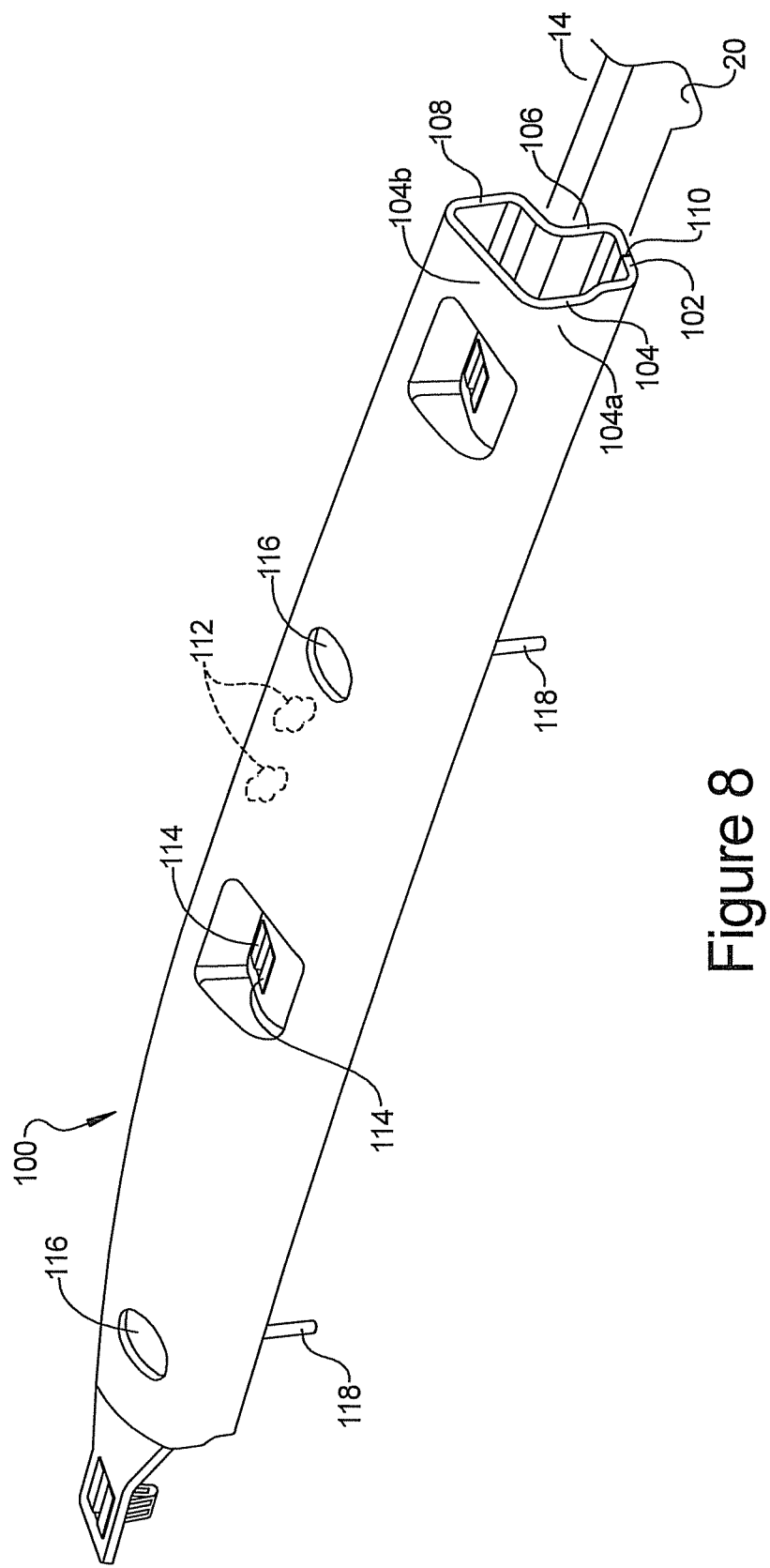
FIG. 8 is a perspective view of just the support rail of FIG. 6 better illustrating its cross sectional shape.
Figure 9:
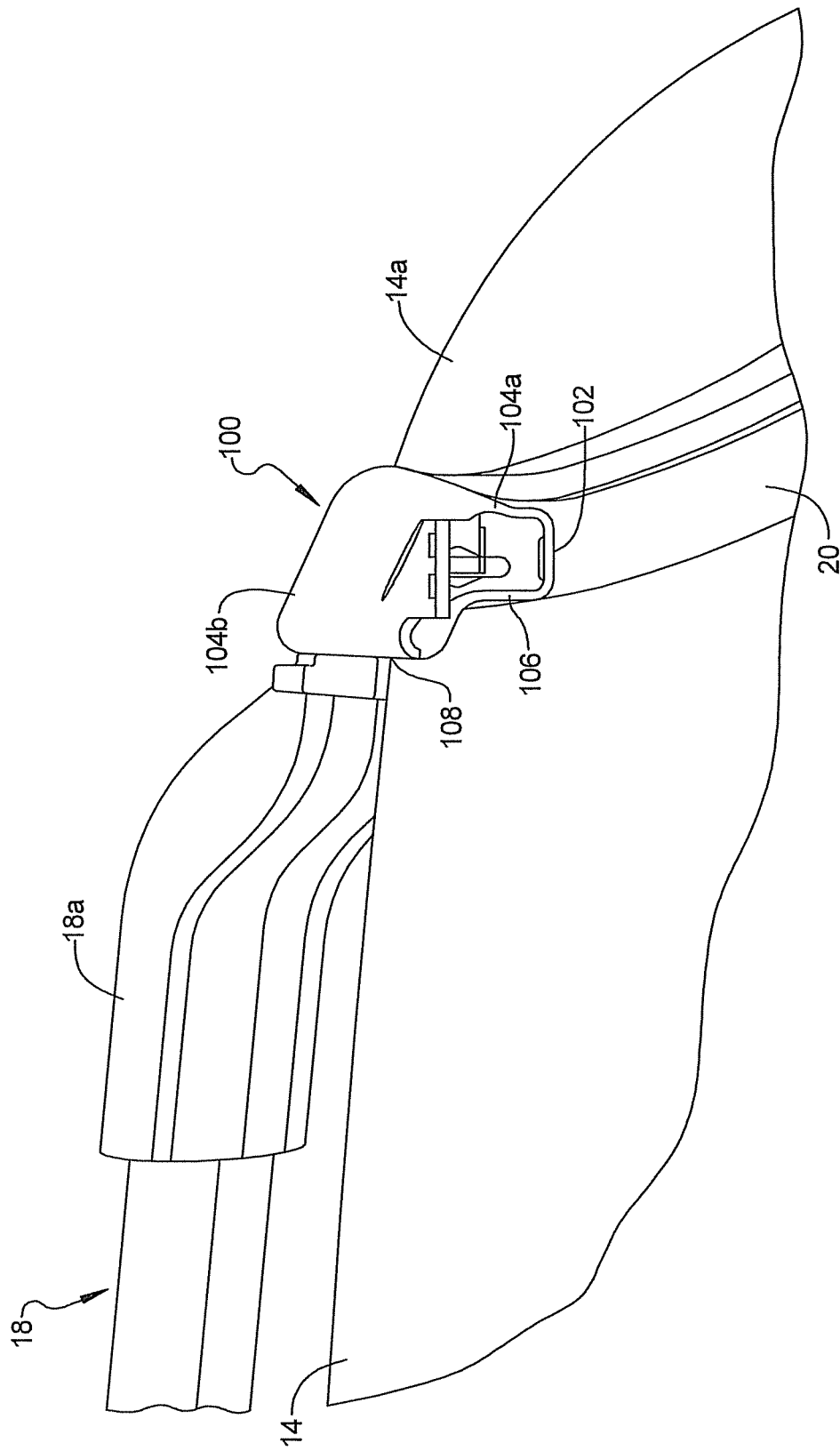
FIG. 9 is a cross sectional end view of the support rail of FIG. 6 better illustrating its cross sectional shape.
Figure 10:
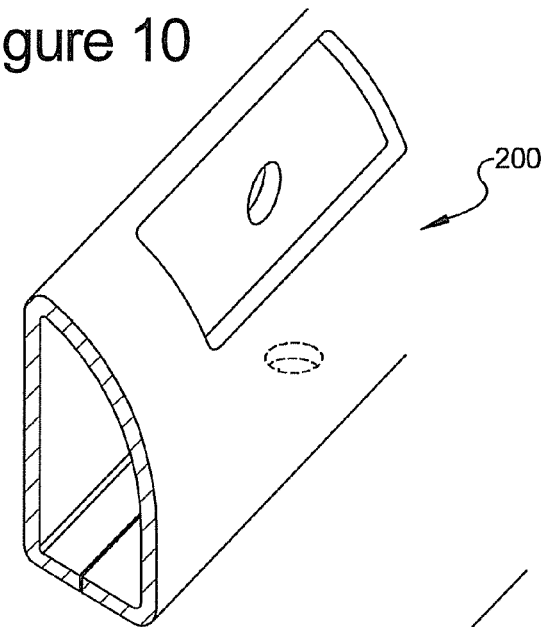
FIGS. 10-14 are perspective views of various other embodiments of a metallic support rail in accordance with the present disclosure.
Figure 11:
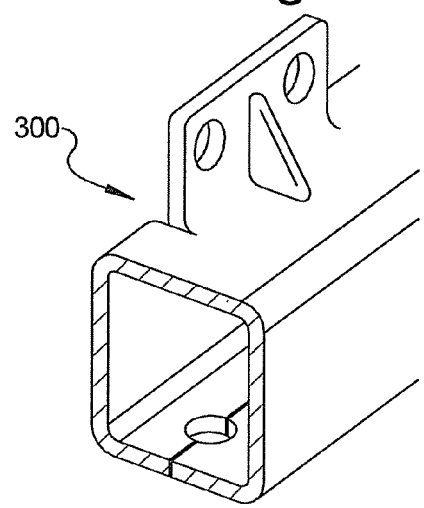
Figure 12:
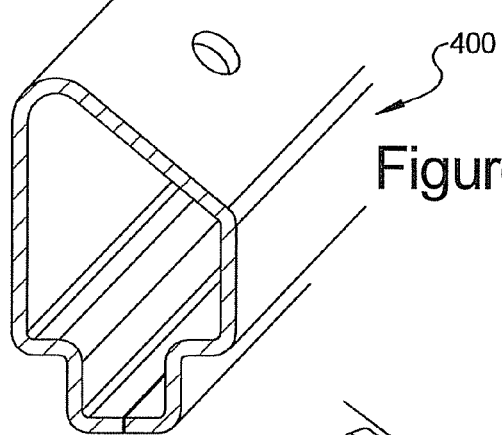
Figure 13:
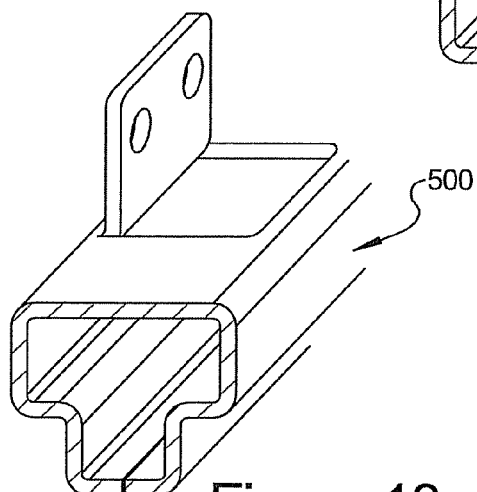
Figure 14:
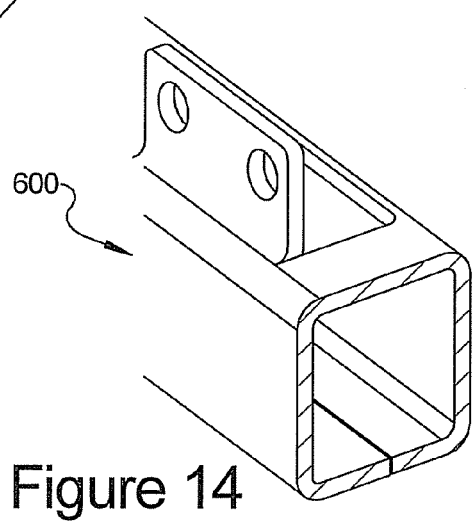

Referring to FIGS. 6-8, a metallic support rail 100 in accordance with another embodiment of the present disclosure is shown. The metallic support rail 100 is similar to metallic support rail 16a in that it is formed from a stamping process that involves stamping a single material blank to form the finished metal support rail 100. Referring specifically to FIG. 8, the metallic support rail 100 includes a bottom wall 102, an outer wall portion 104 having a lower section 104a that rests within the roof ditch 20, an upper section 104b that extends above the roof ditch 20, a lower inner wall section 106 that rests within the roof ditch 20, and an upper inner wall section 108 that is disposed above the roof 14 of the vehicle 12. A seam 110 may be formed at any selected area of the metallic support rail 100. The seam 110 may be just the abutting terminal edges of the material blank used to form the metallic support rail 100, such as seam 22 shown in FIG. 3, or an overlapping seam may be formed such as shown in FIG. 4. The seam 110 is shown located in the bottom wall 102, but it will be appreciated that it may be located at other areas of the metallic support rail 110. Holes 112 may be formed in the upper inner wall section 108 for securing the end support 18a thereto.

Since the wall portion 104b will be covered by a suitable decorative cover, such as cover 16b shown in FIG. 2, the seam 110 could be located on any surface of the metallic support rail 100. Once the decorative cover is installed, the entire metallic support rail 100 will be covered. Spring-like clips 114 may be used to secure a suitable decorative cover similar to cover 16b to the metallic support rail 100. Holes 116 enable access to fasteners 118 to ease installation of the metallic support rail 100 on the vehicle roof 14. Preferably fasteners 118 are disposed at locations such that a crush force experienced along the outer edge 14a of the roof will be at least partially transferred through the metallic support rail 100 to selected pillars of the vehicle 12, and most typically to the A-pillar and the C-pillar of the vehicle. Similarly, the holes 21 in the metallic support rail 16a are located such that they are generally aligned with the pillars of the vehicle 12 so that forces experienced by the metallic support rails 16a can be generally transferred through the fasteners 26 to the pillars (most typically the A-pillar and C-pillar).

With further reference to FIGS. 6-8, the cross-sectional shape and overall longitudinal contour of the metallic support rail 100 will also be such that it rests nestably within the roof ditch 20 along the length of the roof ditch. Thus, the cross sectional shape and overall longitudinal contour of the metallic support rail 100, as well as its decorative cover, is selected based on the cross sectional shape of the roof ditch 20 and the contour of the vehicle roof 14, and the desired aesthetic appearance. The metallic support rail 100 is formed from a suitable shaped blank of material similar to that described in connection with the rail 16a shown in FIG. 5.

With either of the metallic support rails 16a or 100, the ability to utilize a stamping operation enables both aesthetic and mechanical design features to be incorporated into the metallic support rails 16a and 100 that would not be possible utilizing an extrusion or roll forming process. Furthermore, the tubular construction of the fully formed metallic support rail 16a or 100 provides significant added strength and rigidity to the roof 14 once the rail is secured to the roof 14. This is expected to significantly enhance the crush resistance of the roof 14 in a roll over event. As such, this is expected to relieve, at least somewhat, the need for OEM vehicle manufacturers to incorporate additional structural design features in the roof 14 which would most likely increase weight, cost and complexity of the vehicle itself. Thus, the metallic support rails 16a and 100 provide the dual functions of vehicle article carrier support rails as well as structural strengthening members for the roof 14. Advantageously, these functions are achieved without significant added weight or cost to the vehicle itself, and do not complicate the construction of the vehicle or necessitate any significant structural modifications to the roof 14 of the vehicle. Accordingly, the metallic support rails 16a and 100 are expected to significantly help OEMs of motor vehicles to meet increasingly demanding roof crush tests that simulate the forces that a vehicle roof experiences in a roll over event.

Referring to FIG. 10-14, further metallic support rails 200-600 are shown to illustrate other various support rails shapes that are possible through the stamping process of the present application. These illustrations are merely exemplary, and those skilled in the art will understand that other cross sectional shapes and designs are possible as well.

The metallic support rails may be formed with a carbon fiber construction as well. Such a construction would also produce extremely strong yet very light weight components.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A vehicle article carrier system for securing articles above an outer body roof surface of a vehicle, wherein the outer body roof surface includes a pair of roof ditches formed therein that extend generally parallel to one another along a major longitudinal length of the vehicle, the vehicle article carrier system comprising:
   a pair of support rails adapted to be secured to the outer body roof surface within respective ones of the roof ditches;
   at least one cross bar configured to be secured to the support rails to extend generally perpendicularly between the support rails, the at least one cross adapted to support articles thereon above the outer body roof surface;
   each one of said pair of support rails being formed from a stamping process and including:
      a bottom wall;
      a pair of sidewalls extending from the bottom wall;
      an upper wall extending from the pair of sidewalls;
      a cross bar mounting portion extending from at least one of the sidewalls and the upper wall, the cross bar mounting portion forming a structural component to which a portion of the cross bar may be attached to support the cross bar in an operative position;
      at least the bottom wall and portions of the sidewalls being formed with a cross sectional shape in close accordance with a cross sectional shape of its respective said roof ditch to nest within its respective said roof ditch; and
      a fastener for securing the bottom wall to its respective said roof ditch, and wherein the cross sectional shape of the support rail and its nested mounting within its respective said roof ditch serves to enhance a structural strength of the outer body roof surface.

2. The vehicle article carrier of claim 1, wherein the support rail is formed from a single piece of metallic material.

3. The vehicle article carrier of claim 1, further comprising a pair of decorative plastic covers, with each said decorative plastic cover adapted to be secured to a respective one of the support rails.

4. The vehicle article carrier of claim 3, further comprising a plurality of fastening elements for securing each said decorative plastic cover to its respective said support rail.

5. The vehicle article carrier of claim 1, wherein each said cross bar mounting portion includes at least one integrally formed gusset for enhancing structural strength thereof.

6. The vehicle article carrier of claim 1, wherein each said cross bar mounting portion includes at least one hole adapted to receive an external fastening element for fastening one end of the cross bar thereto.

7. The vehicle article carrier of claim 1, wherein portions of the upper wall of the support rail overlap one another.

8. The vehicle article carrier of claim 1, wherein the upper wall includes a plurality of access holes for enabling access to at least one of said fastener or a securing element being used with said fastener to fasten the support rail to the outer body roof surface.

9. The vehicle article carrier of claim 1, wherein said fastener is positioned in said bottom wall to generally align with a pillar of the vehicle, such that forces experienced by said support rail are able to be transferred through the fastener to the pillar of the vehicle.

10. The vehicle article carrier of claim 1, wherein a plurality of spaced apart fasteners are disposed in said bottom wall and located such that at least a pair of the fasteners are generally aligned with a plurality of pillars of the vehicle such that forces experienced by said support rail are able to be transferred though the fasteners to the pillars of the vehicle.

11. A vehicle article carrier system for securing articles above an outer body roof surface of a vehicle, wherein the outer body roof surface includes a pair of roof ditches formed therein that extend generally parallel to one another along a major longitudinal length of the vehicle, the vehicle article carrier system comprising:
   a pair of support rails adapted to be secured to the outer body roof surface within respective ones of the roof ditches;
   at least one cross bar configured to be secured to the support rails to extend generally perpendicularly between the support rails, the at least one cross adapted to support articles thereon above the outer body roof surface;
   each one of said pair of support rails being formed from a stamping process from a single piece of material and including:
      a bottom wall having structure enabling it to be secured to said outer body roof surface;
      a pair of sidewalls extending from the bottom wall;
      an upper wall extending from the pair of sidewalls;
      a cross bar mounting portion extending outwardly from at least one of the sidewalls and the upper wall, the cross bar mounting portion projecting above the upper wall and forming a structural component to which a portion of the cross bar may be attached to support the cross bar in an operative position;
      at least the bottom wall and portions of the sidewalls being formed with a cross sectional shape in close accordance with a cross sectional shape of its respective said roof ditch to nest within its respective said roof ditch; and
      wherein the cross sectional shape of the support rail and its nested mounting within its respective said roof ditch serves to enhance a structural strength of the outer body roof surface when the support rail is fixedly attached to its respective said roof ditch.

12. The vehicle article carrier of claim 11, wherein the structure of the bottom wall includes a hole adapted to receive an external fastener, the external fastener fastening the support rail securely within its respective said roof ditch.

13. The vehicle article carrier of claim 11, wherein said structure of the bottom wall includes a plurality of spaced apart holes adapted to receive a corresponding plurality of external fasteners.

14. The vehicle article carrier of claim 11, wherein the structure of the bottom wall includes a plurality of holes, and wherein at least one of the holes is positioned to generally align with a placement of one of a plurality pillars of the vehicle, to thus enable a transfer of force generally through the one pillar by an external fastening element used to secure the support rail in said respective roof ditch.

15. The vehicle article carrier of claim 11, wherein a plurality of the holes are located to align with a plurality of pillars of the vehicle.

16. A vehicle article carrier system for securing articles above an outer body roof surface of a vehicle, wherein the outer body roof surface includes a pair of roof ditches formed therein that extend generally parallel to one another along a major longitudinal length of the vehicle, the vehicle article carrier system comprising:
 a pair of support rails adapted to be secured to the outer body roof surface within respective ones of the roof ditches;
 at least one cross bar configured to be secured to the support rails to extend generally perpendicularly between the support rails, the at least one cross bar adapted to support articles thereon above the outer body roof surface;
 each one of said pair of support rails being formed from a stamping process from a single piece of material and including:
  a bottom wall having first structure enabling it to be secured to said outer body roof surface;
  a pair of sidewalls extending from the bottom wall;
  an upper wall extending from the pair of sidewalls, the upper wall having second structure enabling the at least one cross bar to be secured thereto and supported from the upper wall;
  at least the bottom wall and portions of the sidewalls being formed with a cross sectional shape in close accordance with a cross sectional shape of its respective said roof ditch to nest within its respective said roof ditch; and
  wherein the cross sectional shape of the support rail and its nested mounting within its respective said roof ditch serves to enhance a structural strength of the outer body roof surface when the support rail is fixedly attached to its respective said roof ditch.

17. The vehicle article carrier of claim 16, wherein the second structure of the upper wall includes an opening adapted to engage with a portion of an external fastening element associated with the at least one cross bar.

18. The vehicle article carrier of claim 16, wherein a seam is formed along the bottom wall of the support rail.

19. The vehicle article carrier of claim 16, wherein the first structure includes a plurality of holes adapted to be used with external fastening elements to fasten the bottom wall within its respective said roof ditch.

20. The vehicle article carrier of claim 19, wherein the plurality of holes is configured such that specific ones of said plurality of holes are located generally in line with a plurality of pillars of a body of the vehicle.

\* \* \* \* \*